United States Patent
Torikoshi et al.

(10) Patent No.: US 6,624,604 B2
(45) Date of Patent: Sep. 23, 2003

(54) WIPER CONTROLLER WITH FAULT DETECTOR DEVICE

(75) Inventors: Akihiko Torikoshi, Shizuoka (JP); Akira Serizawa, Shizuoka (JP); Yuichi Nakazawa, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/987,315

(22) Filed: Nov. 14, 2001

(65) Prior Publication Data

US 2002/0056858 A1 May 16, 2002

(30) Foreign Application Priority Data

Nov. 15, 2000 (JP) ........................................ 2000-348152

(51) Int. Cl.$^7$ ................................................ H02P 7/00
(52) U.S. Cl. .................. 318/443; 318/442; 318/444; 318/445; 318/280; 318/281; 318/282; 318/283; 318/DIG. 2; 15/250.001; 15/256.5; 15/256.51
(58) Field of Search ............................ 318/DIG. 2, 442, 318/444, 443, 280–283, 445; 15/250.001, 256.5, 256.51

(56) References Cited

U.S. PATENT DOCUMENTS

| | | | |
|---|---|---|---|
| 5,041,940 A | 8/1991 | Sullivan | ........................ 361/18 |
| 6,023,107 A | 2/2000 | Grass | ........................ 307/10.1 |
| 6,400,110 B1 * | 6/2002 | Yabe et al. | ................. 318/443 |

FOREIGN PATENT DOCUMENTS

| | | |
|---|---|---|
| DE | 39 36 544 A1 | 6/1990 |
| GB | 2 368 408 A1 | 5/2002 |
| JP | 4-278867 | 10/1992 |
| JP | 9-193748 | 7/1997 |

\* cited by examiner

Primary Examiner—Robert E. Nappi
Assistant Examiner—Renata McCloud
(74) Attorney, Agent, or Firm—Armstrong, Westerman & Hattori, LLP

(57) ABSTRACT

A wiper control device in which an abnormal condition of a FET is detected by distinguishing an action of an overheat-cutting protective function normally difficult to be detected with measuring the drain voltage of the FET and by which the control of the pertinent FET is restrained upon the detection of abnormality so as to prevent a short circuit in the wiper control device from occurring. When an FETB (Qb) is set on, whether or not a drain voltage Vd is lower than Vpe (½VG) is judged (step S5), and if lower, it is judged that the drain and ground is short-circuited, that is, an overheat-cutting protective function is acted, and "1" is added to the number of times of short circuit detection Perror (step S7). It is judged whether or not the added value of the number of times of short circuit detection Perror reaches a reference value (step S11). If the reference value is reached, it is judged that the drain and ground is actually short-circuited, that is, an overheat-cutting protective function is acted, and each action of a FETA (Qa) and FETB (Qb) is halted (step S13).

4 Claims, 14 Drawing Sheets

Td : 240μsec±25%

Ti2 : 6.4sec±25%
T-n : NO REGULATION FOR PERIOD OF TIME
T-04 : 0.40±0.15sec
T-09 : NOT LESS THAN 0.9±0.3sec
Tw2 : 2.8±0.7sec
Tm : 600±200msec

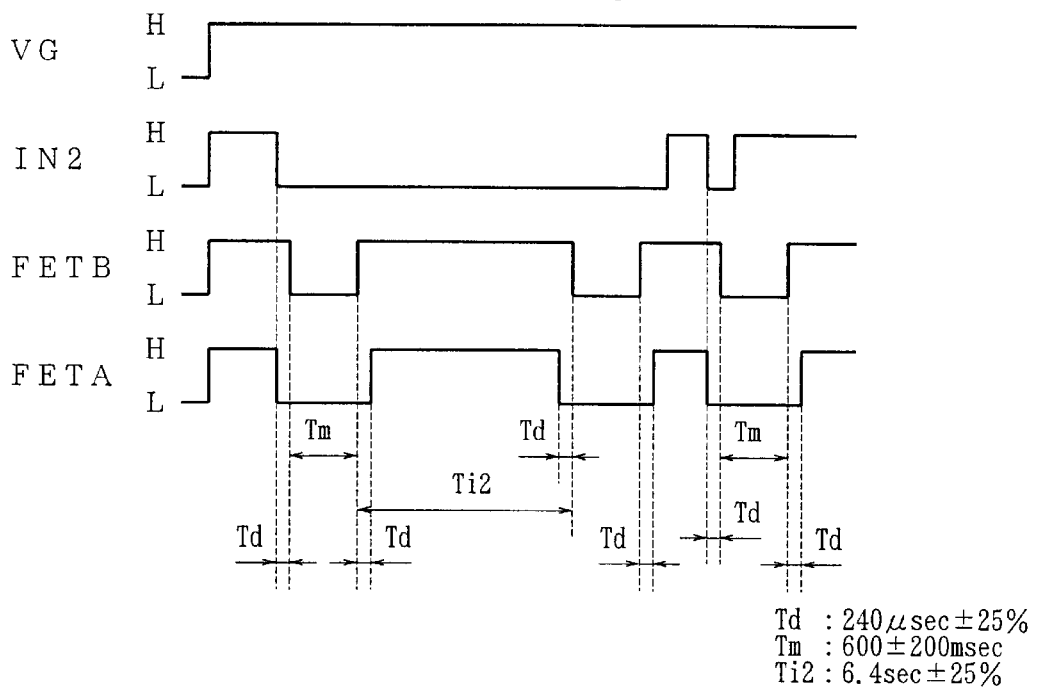
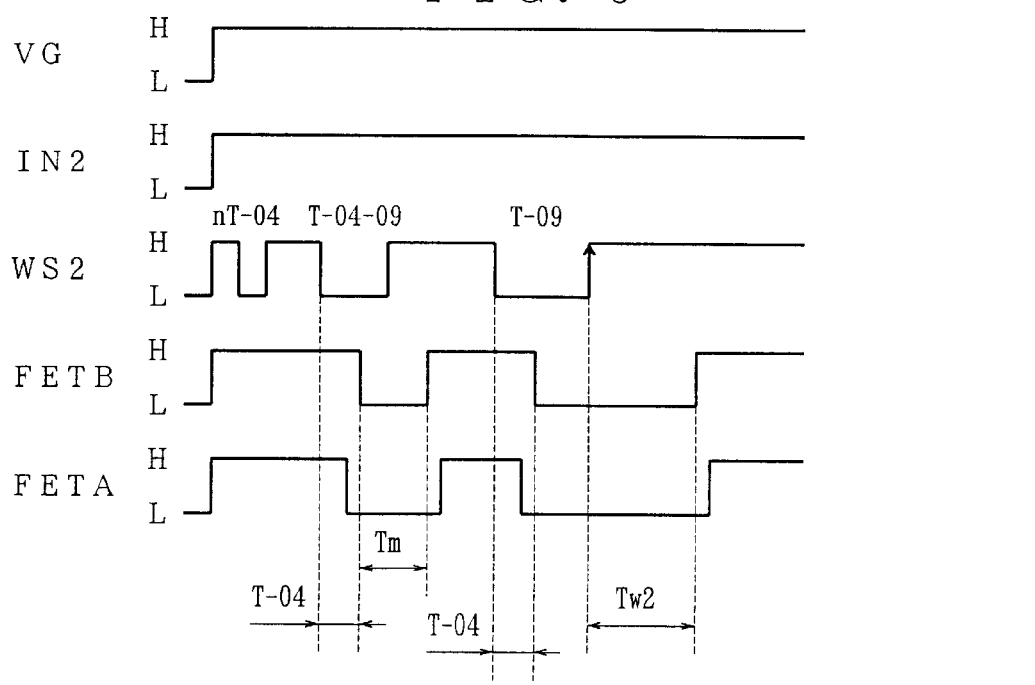

FIG. 15

| VG CONDITION | 8 | | 13.5 | | 18 | | REMARK |
|---|---|---|---|---|---|---|---|
| | FETA | FETB | FETA | FETB | FETA | FETB | |
| NORMAL | −4.00 | 4.00 | −6.75 | 6.75 | −9.00 | 9.00 | |
| LOCKED | −4.00 | 2.00 | −6.75 | 3.75 | −9.00 | 5.00 | |
| VB SHORT-CIRCUITED | 4.00 | | 6.75 | | 9.00 | | |
| GND SHORT-CURCUITTED | | −4.00 | | −6.75 | | −9.00 | |
| DURING BRAKING | | | | | | | INVERSE ELECTROMOTIVE FORCE 75V |

N···REFERENCE VALUE

DETECTION TIMING OF OVERHEAT-CUTTING PROTECTIVE ACTION

DETECTION TIMING OF OVERHEAT-CUTTING PROTECTIVE ACTION

DETECTION TIMING OF OVERHEAT-CUTTING PROTECTIVE ACTION

IN THE EVENT OF SHORT-CIRCUIT BETWEEN MTR AND GND

WIPER CONTROLLER WITH FAULT DETECTOR DEVICE

BACKGROUND OF THE INVENTION

(1) Field of the Invention

The present invention relates to a wiper control device, in which a semiconductor switch element such as a MOS-FET (metal oxide semiconductor field-effect transistor) is employed as a drive-control element of a motor.

(2) Description of the Related Art

A conventional wiper control device is disclosed in Japanese Patent Application Laid-Open No. H9-193748. As shown in FIG. 21, in this wiper control device, when a combination switch 17 is set in an intermittence mode (INT), a driving circuit 20 turns a switch element 19 ON to start a motor 15, thereby allowing a wiper to make one reciprocating motion. When the wiper makes one reciprocating motion, a terminal P of a wiper switch 16 is connected to a terminal Q and the driving circuit 20 turns the switch element 19 OFF to cut off the electric power supply supplied to the motor 15. When the terminal P of the wiper switch 16 is connected to the terminal Q, a terminal K at the battery voltage side is connected to a terminal J at the ground side by way of a contact terminal Ti and a brake resistance 18 to control the motor 15, thereby the wiper quickly stops.

There is another driving circuit of a wiper motor as shown in FIG. 6.

Qb is a P-channel-type MOS-FET, which acts as a semiconductor switch element for supplying or cutting a driving voltage supplied to a wiper motor M2 through its ON/OFF motion. A drain thereof is connected to the wiper motor M2, a source is connected to a power supply (battery) VG, and a gate is connected to a control output terminal of a controller (not shown in the figure).

Qa is an N-channel-type MOS-FET, which acts as a semiconductor switch element for carrying out a halting action of the wiper motor M2 through its ON/OFF motion. A drain thereof is connected to a drain of a MOS-FETA (Qa) by way of a Zener diode ZD, a source is grounded, and a gate is connected to the control output terminal of the controller.

The conventional wiper control device described above has the following problem.

When a short circuit takes place with VG (battery voltage) or GND (ground) at the high side (FET drain) of the motor, an abnormal current (large current) flows into a MOS-FET (Qa) (hereinafter, FETA (Qa)) for halting the motor or a MOS-FET (Qb) (hereinafter, FETB (Qb)) for driving the motor.

At this time, the FET (field-effect transistor) possibly generates heat making the wiper control device to fire or to generate heat.

In order to prevent the above accident from occurring, an FET including a known overheat-cutting protective function, a constitution of which is shown in FIG. 5, is employed as a FET for driving the motor or for halting the motor.

As shown in FIG. 5, an overheat-cutting protective circuit works as a temperature detection circuit and compares a voltage at a contact between a current source connected to a gate of the FETA (Qa), to which a control signal is supplied from a control output of the controller by way of a resistance R, and a temperature detection part consisting of a plurality of diodes Z1 and Z2, which detect the heat generation of the FETA (Qa), with a reference voltage of a reference voltage source, thereby outputting the result of the comparison as the temperature detection.

After the output of the temperature detection from the temperature detection circuit is supplied to a latch circuit, the output is input to a gate-cutting circuit, which is connected between the gate of the FETA (Qa) and the source, and a gate potential of the FETA (Qa) is set up low level, thereby rendering the FETA (Qa) from ON to OFF, that is, cutting the electric supply.

However, an action of the overheat-cutting protective function brings about a large stress to the FET and a repetition thereof brings about a rapid deterioration of the FET.

Since the overheat-cutting protective function is latched once it is acted, the protective action (i.e., latched state) is not removed unless the input of the action signal to the gate is removed.

However, in this wiper system, regarding either the FETA (Qa) or FETB (Qb), since the ON/OFF motion thereof is repeated for every intermittent action of the wiper, therefore the action of the overheat-cutting protective function is carried out for every ON/OFF motion of the FET. As a result, when the wiper control device is used for a long period of time in an abnormal condition, the action of the overheat-cutting protective function is repeatedly carried out, causing a significant deterioration of the reliability of the circuit.

SUMMARY OF THE INVENTION

It is therefore an objective of the present invention to solve the above problem and to provide a wiper control device, in which the abnormal condition of the FET is detected by distinguishing the action of the overheat-cutting protective function normally difficult to be detected with measuring the drain voltage of the FET, and by which the control of the pertinent FET is restrained upon the detection of abnormality, thereby preventing the accident in the wiper control device from occurring.

In order to attain the above objective, as shown in a basic constitutional illustration of FIG. 1, the present invention is to provide a wiper control device comprising a controller for outputting a control signal, which responds to a drive or halt of a wiper motor, to a first field-effect transistor and a second field-effect transistor, wherein the wiper motor is connected between a drain of the first field-effect transistor and ground or between the drain and a power supply, the first and second field-effect transistors are connected in series between the power supply and ground through the drain, and the controller comprises:

- drain voltage detection means for detecting a drain voltage of the first field-effect transistor or the second field-effect transistor;
- short circuit detection means for detecting a short circuit of a drain circuit on the basis of an abnormal value of the detected drain voltage;
- count means for counting the number of times of the detection of the short circuit;
- comparison means for comparing the number of times of the detection of the short circuit with a predetermined reference number of times; and
- judgment means for judging an occurrence of the short circuit when the number of times of the detection of the accident consecutively reaches the reference number of times. Thereby, the field-effect transistor (FET) judged involved with an occurrence of the short circuit is set OFF and the control of the pertinent FET is halted thereafter. Preferably, the short circuit detection means comprises:

first detection means for detecting a short circuit of the drain coming into contact with ground when the drain voltage approximates to the ground potential upon the first field-effect transistor being on; and second detection means for detecting a short circuit of the drain coming into contact with the power supply when the drain voltage approximates to a power supply voltage upon the second field-effect transistor being on.

Thereby, when the potential generated at the drain is not a normal potential upon the action of the first field-effect transistor or the second field-effect transistor being on, a matter of the short circuit is judged on the basis of the potential generated at the drain.

Preferably, the short circuit detection means is provided with delay means for taking in the detected drain voltage with a specific delay time. Thereby, the drain voltage is output with a specific delay time, preventing an instantaneously changed drain voltage from being taken in as a voltage judged indicating an accident.

Preferably, the delay means is constituted by a digital filter, thereby the delay time can be minutely set up and facilitated to be changed.

BRIEF DESCRIPTION OF THE DRAWINGS

FIG. 8 is a timing chart illustrating the intermittent action of a wiper motor according to the preferred embodiment;

FIG. 9 is a timing chart illustrating a subsequent wiping action of a wiper motor according to the preferred embodiment;

FIG. 15 is a table describing each drain voltage in FIGS. 11–14 for each condition described above;

DESCRIPTION OF THE PREFERRED EMBODIMENTS

In the following, a wiper control device according to the preferred embodiment of the present invention will be explained with reference to the attached drawings.

Figure 1:
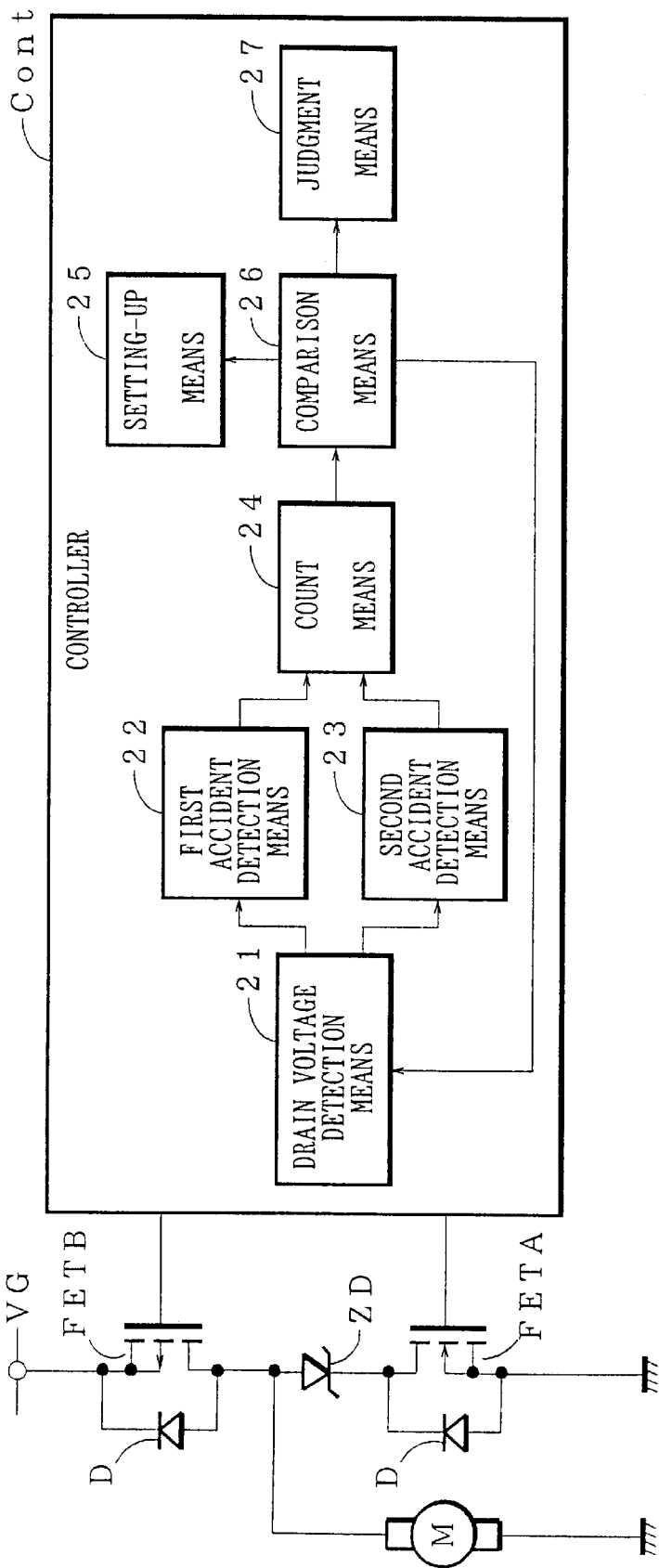
FIG. 1 shows a basic constitution of a wiper control device according to the present invention.
Figure 2:
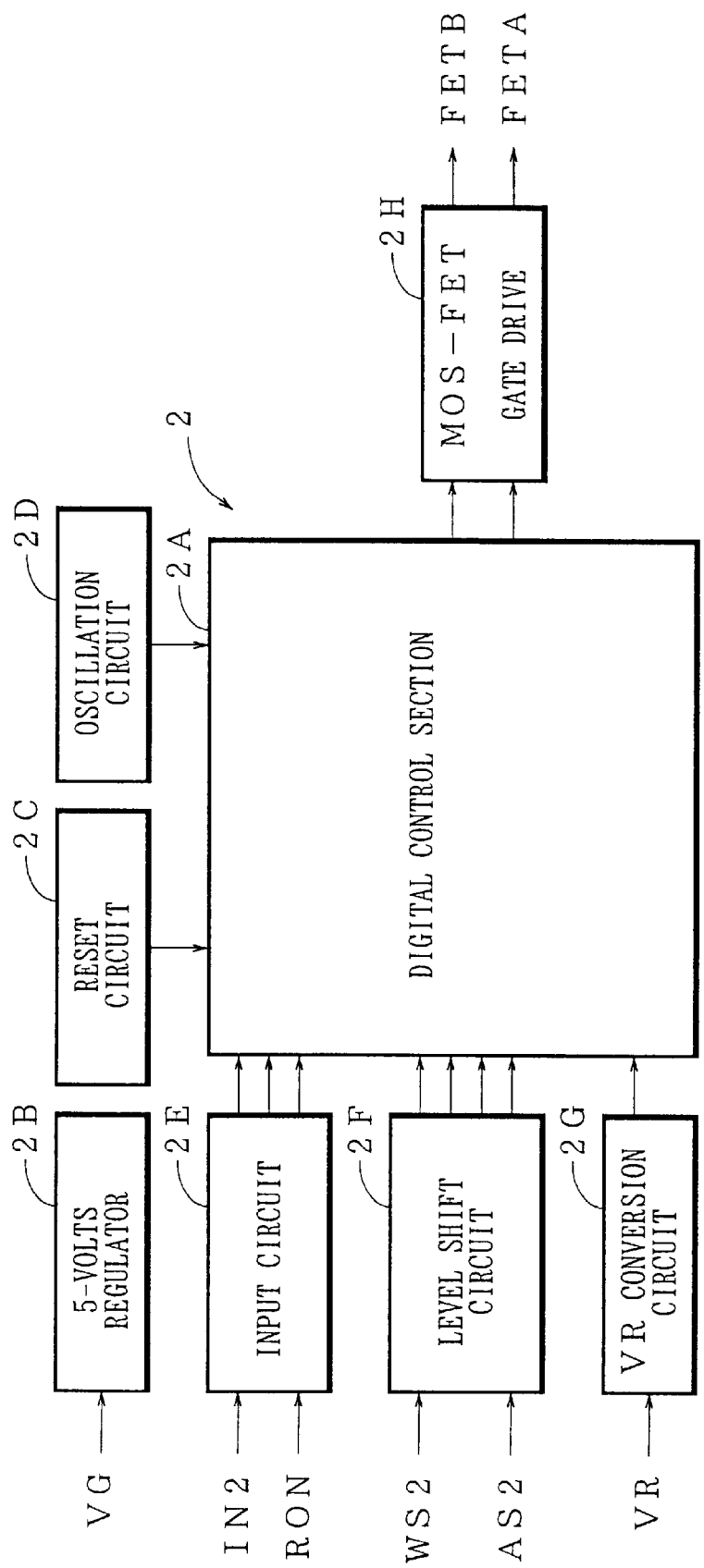
FIG. 2 is a block diagram illustrating a constitution of a controller according to the preferred embodiment of the present invention.

FIG. 2 is a block diagram illustrating a constitution of a controller according to the preferred embodiment of the present invention.

As shown in FIG. 2, a controller 2 consists of a digital control section 2A, 5-volts regulator 2B, reset circuit 2C, oscillation circuit 2D, input circuit 2E, level shift circuit 2F, variable resistance (VR) conversion circuit 2G, and MOS-FET gate drive 2H.

The digital control section 2A consists of, for example, a microcomputer and so on, controlling the whole operation of the wiper control device.

The 5-volts regulator 2B adjusts a battery voltage, in which a battery power supply voltage VG (for example, 13.5 volts) is supplied from a battery, that is, a power supply of a vehicle, by way of an ignition switch (IG) and a fuse, to be, for example, DC 5 volts and supplies it to the digital control section 2A as a driving voltage.

The reset circuit 2C initializes the action of the digital control section 2A when the power supply voltage is supplied to the wiper control device by turning the IG switch on.

The oscillation circuit 2D generates a clock signal for the digital control section 2A and supplies it to the digital control section 2A.

The input circuit 2E detects the ON/OFF of an IN2 terminal and RON terminal (explained later on) of the controller 2 and supplies an INT (intermittent wiper action) mode-ON signal or a RON (consecutive wiper action) mode-ON signal to the digital control section 2A.

The level shift circuit 2F converts the battery power supply voltage (13.5 volts), which is detected by a WS2 terminal and AS2 terminal of the controller 2, to 5 volts and supplies the detection signal to the digital control section 2A.

The VR conversion circuit 2G is connected to a VR terminal of the controller 2 and is provided for setting up an intermittence time during the INT mode.

The MOS-FET gate drive 2H converts a digital output for controlling the MOS-FET, which is output from the digital control section 2A, to an action level voltage of the MOS-FET and outputs it to a control output terminal FETA and a control output terminal FETB of the controller 2.

Under the control by the controller 2 and the digital control section 2A, there are characteristic functions as follows:

(Function A)—to send the control output to the FETA (Qa) and FETA (Qb) with a time delay td;

(Function B)—to keep outputting the control output to the FETB (Qb) until the wiper returns to its parking position in the event that the wiper action is terminated at its halfway position;

(Function C)—to accurately provide the number or the period of times of subsequent wiping after a wash action;

(Function D)—to accurately provide the number or the period of times of subsequent wiping even in the event that the wash is switched from ON to OFF during subsequent wiping after a wash action;

(Function E)—to carry out the digital conversion of the resistance value of the variable resistance (VR) for accurately providing the period of times of subsequent wiping; and (Function F)—to set up the period of times of subsequent wiping to be a specific value when the VR terminal of the controller 2 is opened.

Furthermore, the wiper control device according to the preferred embodiment has additional functions as follows:

(Function G)—to detect an abnormal condition of the FET by distinguishing an action of the overheat-cutting protective function normally difficult to be detected with measuring the drain voltage of the FET; and (Function H)—to restrain the control of the pertinent FET (i.e., to cut off the gate voltage) upon the detection of abnormality, thereby preventing a possible accident in the wiper control device from occurring.

In the following, the preferred embodiments of the present invention will be explained by stressing the above Functions G and H, which are main features of the present invention.

Figure 3:
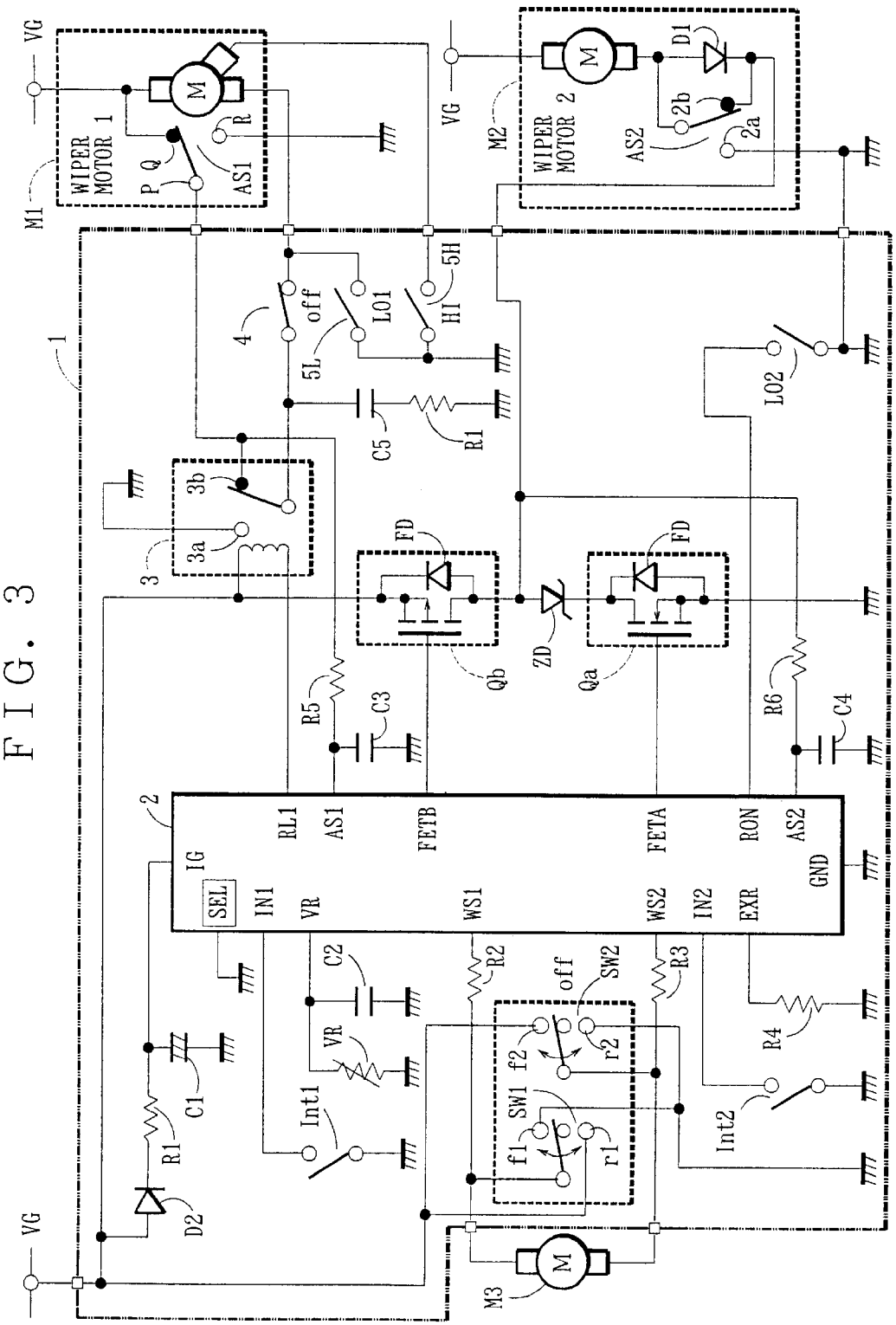
FIG. 3 shows a whole construction of a wiper control device according to a preferred embodiment.

FIG. 3 shows a whole construction of a wiper control device according to the preferred embodiment, which has each function as described above.

The controller 2 according to the preferred embodiment controls wiper motors M1 and M2 at the front window and rear window, respectively, and a wash motor M3 for driving a pump which injects the cleaning fluid to each window in the corresponding action mode.

In the controller 2, the direct current voltage VG supplied by a battery of the vehicle is subjected to removing the ripple at a diode D2 and a RC filter R1/C1, then applied to a power supply terminal IG. A first intermittence switch IN1 is connected to an IN1 terminal. When the first intermittence switch IN1 is turned on, the potential of the IN1 terminal becomes the ground level, thereby a wiper motor 1 is operated in the intermittent action mode.

A variable resistance VR and a capacitor C2, which are arranged in parallel to each other, are connected to a VR terminal and the wiper action intermittence period of time is set up by adjusting the value of the variable resistance VR. A winding coil of the wash motor M3 is connected to a WS1 terminal and WS2 terminal by way of a resistance R2 and R3, respectively. A traveling contact in a wash switch WS1, in which one contact f1 is connected to ground while another contact r1 is connected to the power supply VG, is connected to a WS1 terminal. A traveling contact in a wash switch WS2, in which one contact f2 is connected to the power supply VG while another contact r2 is connected to ground, is connected to a WS2 terminal.

Therefore, when each traveling contact in the wash switches WS1 and WS2 is connected to the contacts f1 and f2, respectively, a current flows into the wash motor M3 in the normal direction to rotate it in the corresponding normal direction so as to drive the pump, thereby injecting the cleaning fluid to the front window. On the other hand, when each traveling contact in the wash switches WS1 and WS2 is connected to the contacts r1 and r2, respectively, a current flows into the wash motor M3 in the reverse direction to rotate it in the reverse direction so as to drive the pump, thereby injecting the cleaning fluid to the rear window.

Moreover, when each traveling contact in the wash switches WS1 and WS2 is connected to the contacts f1 and f2, respectively, the potential of the WS1 terminal becomes the ground level through the wash switch WS1 while the potential of the WS2 terminal becomes the power supply level through the wash switch WS1, thereby entering in the front-wash mode (FW mode). On the other hand, when each traveling contact in the wash switches WS1 and WS2 is connected to the contacts r1 and r2, respectively, the potential of the WS1 terminal becomes the power supply level through the wash switch WS1 while the potential of the WS2 terminal becomes the ground level through the wash switch WS1, thereby entering in the rear-wash mode (RW mode).

When the controller 2 judges either the FW mode or the RW mode, the wiper motor M1 of the front window or the wiper motor M2 of the rear window is prepared to be driven.

A first intermittence switch Int1 is connected to the IN1 terminal and when the first intermittence switch Int1 is on, the potential of the IN1 terminal becomes the ground level and the potential of RL1 becomes the ground level, thereby operating the wiper motor M1 in the intermittence wiper action mode.

A second intermittence switch Int2 is connected to the IN2 terminal and when the second intermittence switch Int2 is on, the potential of the IN2 terminal becomes the ground level, thereby operating the wiper motor M2 in the intermittence wiper action mode.

When the controller 2 judges the front mode by the first intermittence Int1 being on or the potential of the WS1 terminal being at L-level, the potential of the RL1 terminal becomes the ground level to bias a exciting coil of a relay 3, thereby closing a contact 3a.

As a result, a current flows into the wiper motor M1 from the battery to ground through a winding so as to rotate the motor, thereby starting the wiper action. After the start of the action, when the Int1 switch is off and for example, a LO1 switch 5L out of the LO1 switch 5L and a HI switch 5H, each of which is connected between the corresponding winding of the wiper motor 1 and ground, is set open, a coil for high-speed revolution is selected to operate the wiper motor in high speed. On the other hand, when the HI switch 5H is set open, a coil for low-speed revolution is selected to operate the wiper motor in low speed.

When a relay 3 is demagnetized by an off-action of the first intermittence switch Int1 and the contact is switched to a 3b side, a current flows into the motor M1 through VG, wiper motor M1, relay contact 3b, contact 1b of AS switch AS1 and ground, and the AS switch AS1 selects a shut-down contact Q. As a result, a closed circuit consisting of the relay 3, AS switch AS1 and INT switch 4 is formed at both sides of the wiper motor M1 allowing the same potential thereto, thereby the rotation of the motor is stopped parking the wipers at the parking position thereof.

Figure 5:
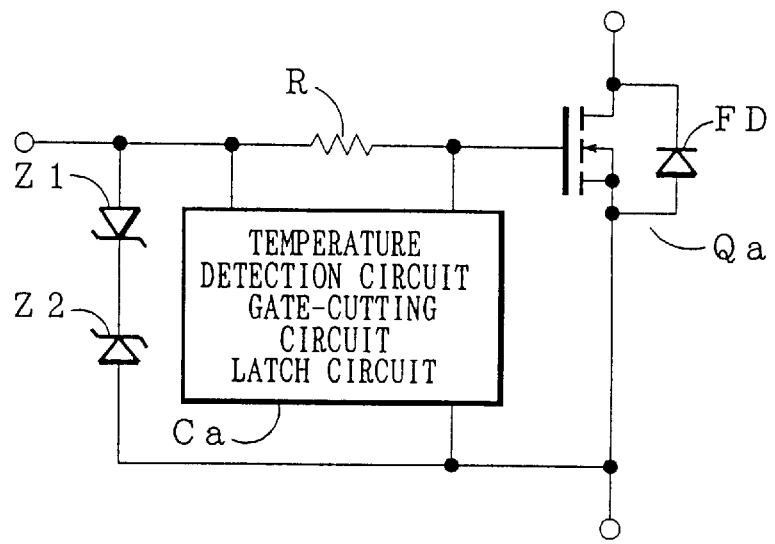
FIG. 5 shows a construction of an overheat-cutting protective circuit according to the preferred embodiment.

Gates of a FETA (Qa) for halting consisting of n-channel MOS-FET having an overheat-cutting protective function and a FETB (Qb) for driving consisting of p-channel MOS-FET having the same function, each constitution of which is shown in FIG. 5, are connected to FTEB and FTEA terminals of the controller 2, respectively. A voltage VG is applied to a source of the FETB (Qb) by the battery, a drain of the FETA (Qa), which carries out a braking action of the wiper motor M2 through the Zener diode ZD, is connected to a drain of the FETB (Qb), and a source of the FETA (Qa) is grounded. The wiper motor M2 is connected between the anode of the Zener diode ZD and ground by way of a diode D1.

At the direct current power supply side of the wiper motor M2, a traveling contact is connected to the cathode-side of the diode D1 and provided is an AS switch AS2 consisting of an always-closing-type fixed contact 2b, which is connected to the anode-side and comes in contact with the traveling contact in response to the revolution of the motor M2, and an always-closing-type fixed contact 2a, which is connected to the battery-side and comes in contact with the traveling contact in response to the revolution of the motor M2.

A drain voltage Vd is input to the AS2 terminal of the controller 2 from the anode-side of the Zener diode ZD through a resistance R6 and a capacitor C4 and is monitored by the controller 2. A RON terminal of the controller 2 is grounded by way of a switch LO2.

In the following, each action of the wiper control device according to the preferred embodiment will be explained.
(Consecutive Wiper Action)

Figure 7:
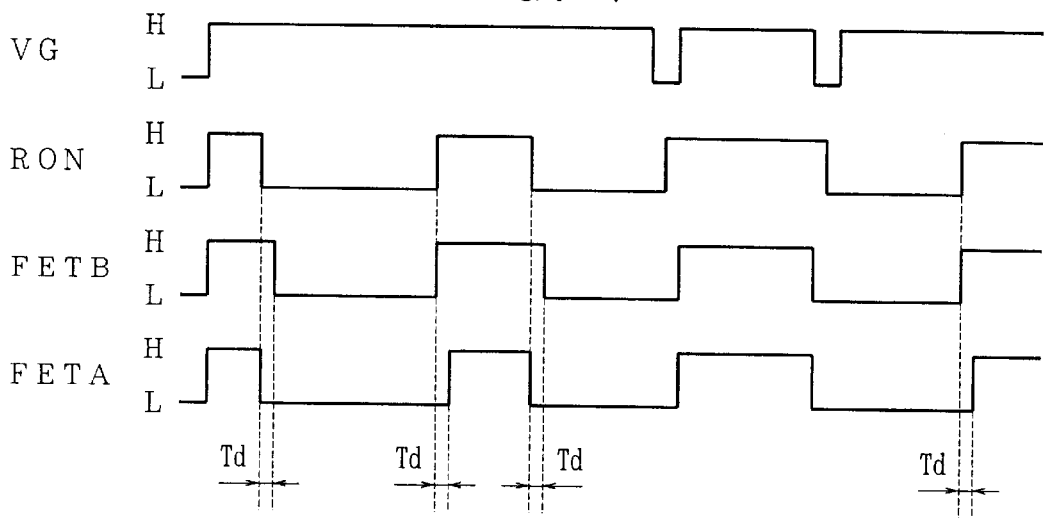
FIG. 7 is a timing chart illustrating the continuous action of a wiper motor according to the preferred embodiment.

When the switch LO2 is set on, the potential of the RON terminal falls down to the ground level. When the controller 2 detects the ground level, as shown in FIG. 7, the controller 2 inputs a L-level signal to a gate of the FETA (Qa), that is, turns it off, and after leaving it for a specific period of delay time Td the controller 2 inputs a L-level signal to the FETB (Qb) and keeps it on. As a result, a current flows into the wiper motor M2 from the battery VG further to ground through the FETB (Qb) not depending upon the action of the AS switch AS2, thereby the wiper motor M2 is continuously operated allowing the wipers to act continuously.
(Halt of Consecutive Wiper Action)

When the LO switch is shut off to make the potential of the RON terminal become H-level, as shown in FIG. 7, the controller 2 inputs a H-level signal to a gate of the FETB (Qb), that is, turns it off, and after leaving it for a specific period of delay time Td the controller 2 inputs a H-level signal to the FETA (Qa) and keeps it on.

As a result, a current flows into the wiper motor M2 from the battery VG further to ground through the operation contact 2a of the AS switch AS2, thereby the wiper motor M2 rotates and the contact of the AS switch AS2 is switched to a halt contact 2b in response to the rotation.

By the switching to the halt contact 2b, a closed circuit consisting of a plus-terminal of the wiper motor M2, AS switch AS2, Zener diode ZD, FETA (Qa) and a minus-terminal of the wiper motor M2 is formed. Consequently, since a reverse current (brake current) suddenly flows into the wiper motor M2 so as to consume a reverse power, a brake is applied to the wiper motor M2 to stop the motor suddenly, thereby the wipers stop without coming out from their parking positions.
(Intermittent Wiper Action)

When the second intermittence switch Int2 is set on to make the potential of the IN2 terminal of the controller 2 become the ground level, as shown in FIG. 8, the controller 2 renders the FETA (Qa) from on (HI) to off (LO) and renders the FETB (Qb) from off (HI) to on (LO) after a period of dead time Td (240 is ec).

The period of dead time Td (240 is ec) is set up to prevent the power supply voltage VG from being grounded in the event that the FETB (Qb) is set on during the FETA (Qa) being set on so as to make a current flow from the power supply to ground through the FETA and FETB.

When the FETB (Qb) is set on, a current flows into the wiper motor M2 from the battery VG further to ground through the FETB (Qb) not depending upon the action of the AS switch AS2, thereby the wiper motor M2 is driven for a period of time Tm (600±200 msec).

However, when the controller 2 renders the FETB set off (HI) and renders the FETA (Qa) set off (HI) after the period of dead time Td, the controller counts a predetermined period of time INT (i.e., a period of time Ti2 while the wiper being stopped; for example, 6.4 sec±25% thereof). During the count, since the FETA is set on, the wiper motor M2 is in an action of braking.

After the count, the controller 2 renders the FETA from set on (HI) to off (LO) again and renders the FETB from set off (HI) to on (LO) after the period of dead time Td.

As a result, a current flows into the wiper motor M2 from the battery VG further to ground through the FETB (Qb), thereby the wiper motor M2 is driven for a period of time Tm (600±200 msec). The intermittent wiper action is carried out by repeating the actions mentioned above.
(Subsequent Wiping Action after Wash)

For example, when each wash switch WS1 or WS2 is switched from the off position to the rear wash position r1 or r2, a current flows from the battery VG to ground through the wash switch WS1, wash motor M3 and wash switch WS2 in turn, thereby the wash motor 9 starts to rotate. The wash motor 9 actuates a pump (not shown in the figure) to feed the cleaning fluid from a cleaning fluid tank onto a windshield.

Figure 10:
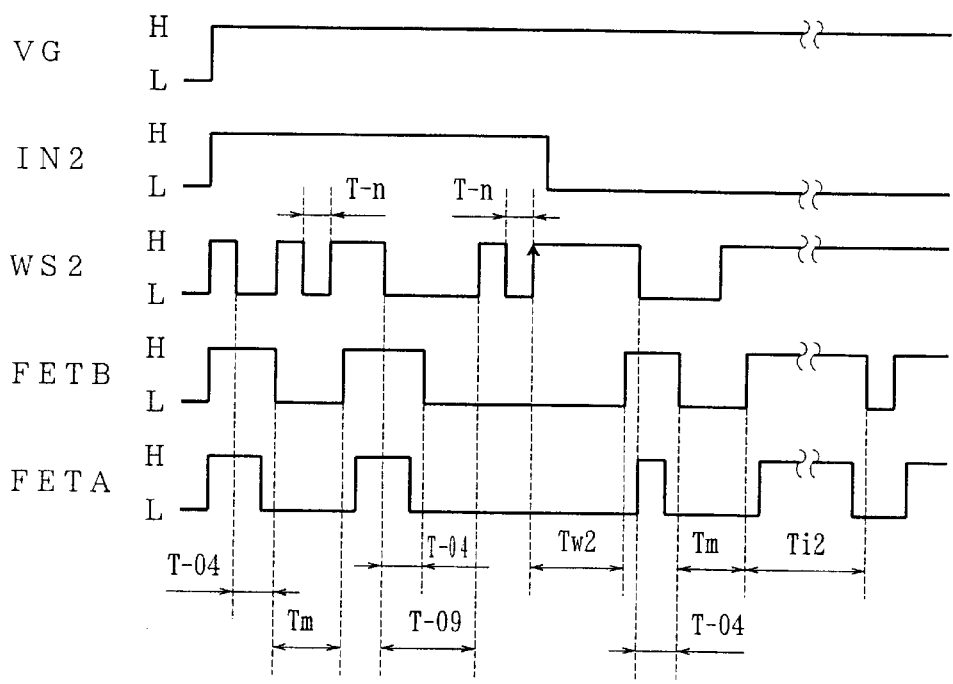
FIG. 10 is a timing chart illustrating a subsequent wiping action of a wiper motor according to the preferred embodiment.

An ON signal (low level) is input to the WS2 terminal of the controller 2 at the same time with the electric conduction to the wash motor 9. After setting up of the ON signal, as shown in FIGS. 9 and 10, the controller 2 renders the FETA (Qa) set off after a period of delay time T-04 and subsequently renders the FETB (Qb) set on after the period of dead time.

When the FETB is set on, the wiper motor M3 starts to rotate and the wipers make a reciprocating motion on the windshield, thereby cleaning the windshield with the cleaning fluid. When each wash switch SW1 or SW2 is in the rear wash position r1 or r2, the controller 2 keeps outputting the L-level signal to the FETB (Qb) and FETA (Qa). The period of delay time T-04 is set up taking a period of delay time, from when the revolution of the wash motor M3 starts until the cleaning fluid reaches the windshield, into consideration.
(Overheat-Cutting Protective Action)

Figure 6:
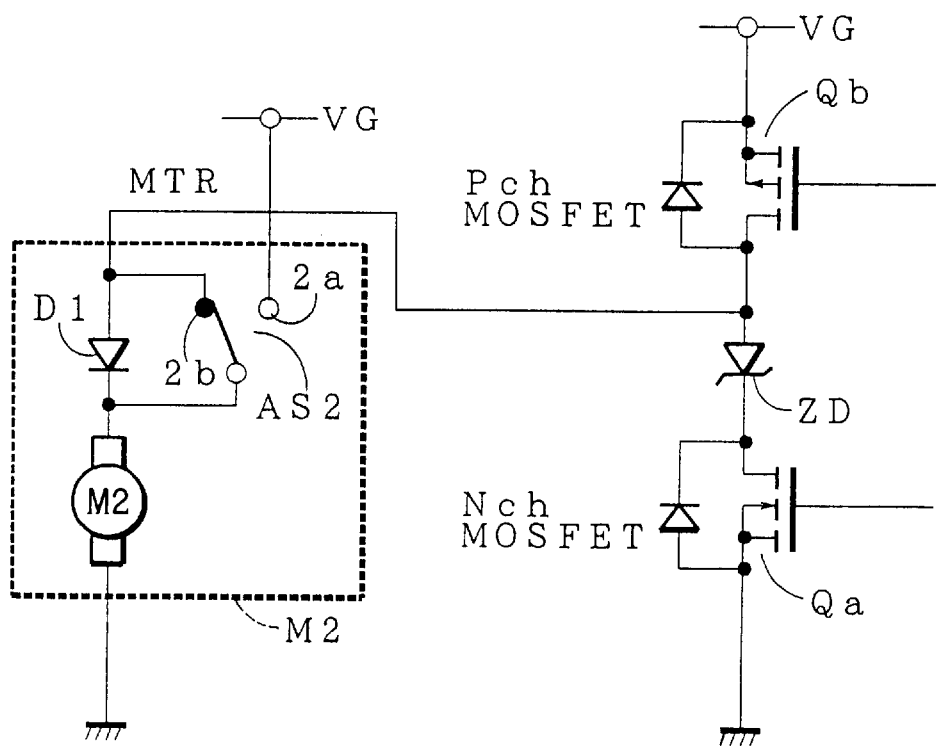
FIG. 6 illustrates the control of a wiper motor according to the preferred embodiment.

In the following, a detection method of the overheat-cutting protective action for the MOS-FET in the wiper control device according to the preferred embodiment will be explained with an example of the FETB (Qb) for driving the wiper motor M2 and the FETA (Qa) for braking the motor shown in FIG. 6.

Before explaining the detection method of the overheat-cutting protective action in detail, an abstract of judgment for the overheat-cutting protective state will be explained.

Figure 11:
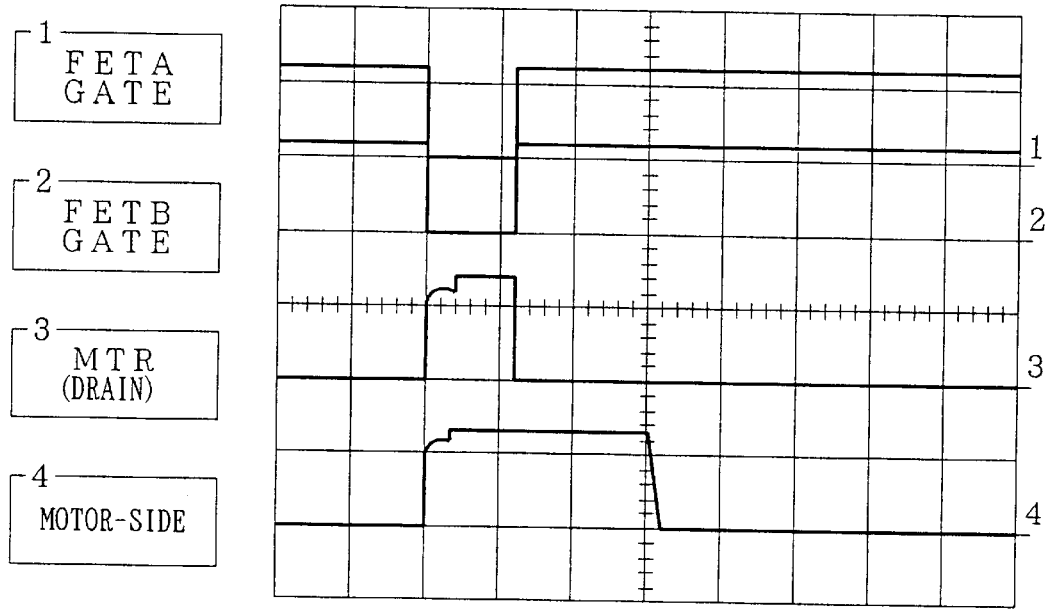
FIG. 11 shows waveform graphs of the drain voltage of each FET when the wiper motor operates normally.
Figure 17:
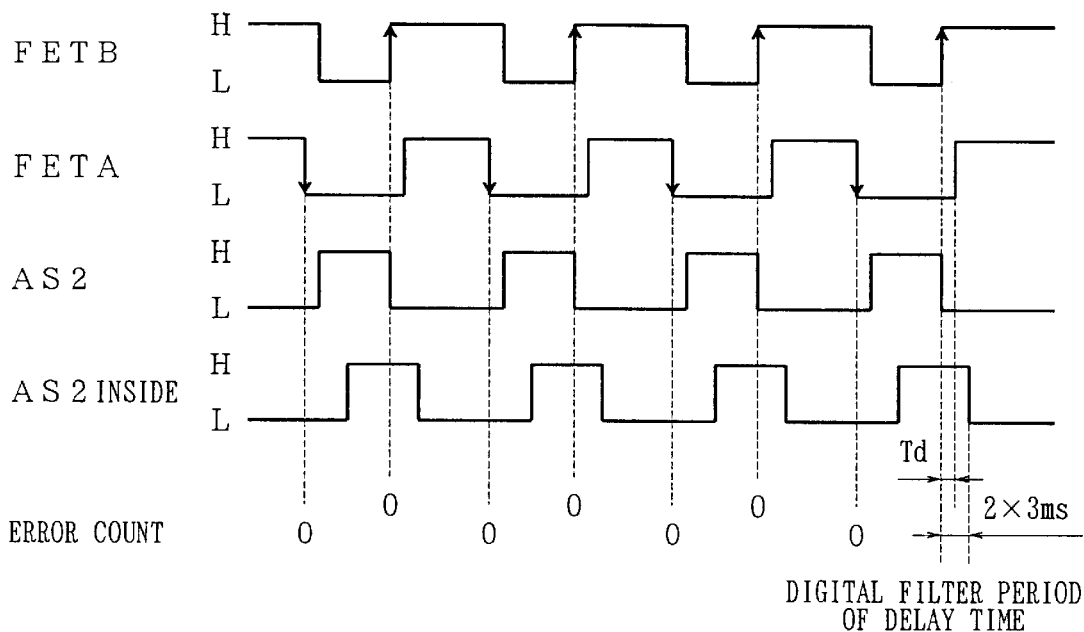
FIG. 17 illustrates the drain voltage in a normal condition.

In general, as shown in FIG. 17, the FETB (Qb) is set off when a motor control circuit consisting of the FETA (Qa) and FETB (Qb) operates normally, while a monitored voltage of the MTR detected by the AS terminal is lower than ½VG when the FETA (Qa) is set on. As shown in waveform graphs of FIG. 11, in a normal operation, turbulence in the waveform, which may bring about an error in detection, is not observed.

For a timing of setting the FETA (Qa) off (build-up edge of the FETA), when a monitored voltage of the MTR (drain) is higher than a threshold ½VG, the FETA(Qa) is judged to be in an overheat-cutting protective condition.

For a timing of setting the FETB (Qb) off (build-up edge of the FETB), when a monitored voltage of the MTR (drain) is lower than a threshold ½VG, the FETB (Qb) is judged to be in an overheat-cutting protective condition.
(1) In the Circumstance when the MTR Line Short-circuits to the VG (the Protection of the FETA (Qa))

Figure 13:
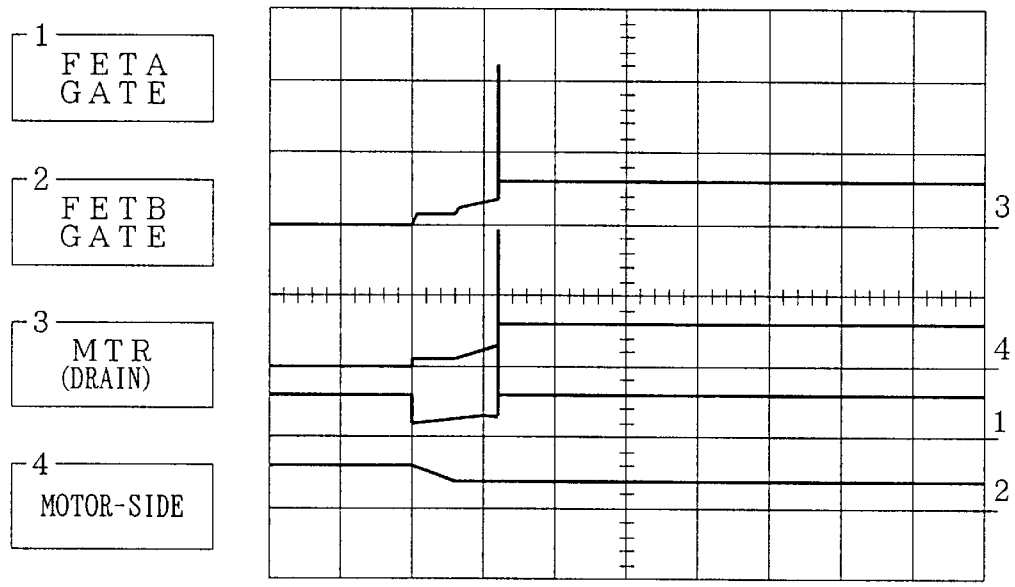
FIG. 13 shows waveform graphs of the drain voltage of each FET when the drain short-circuits to the power supply.
Figure 18:
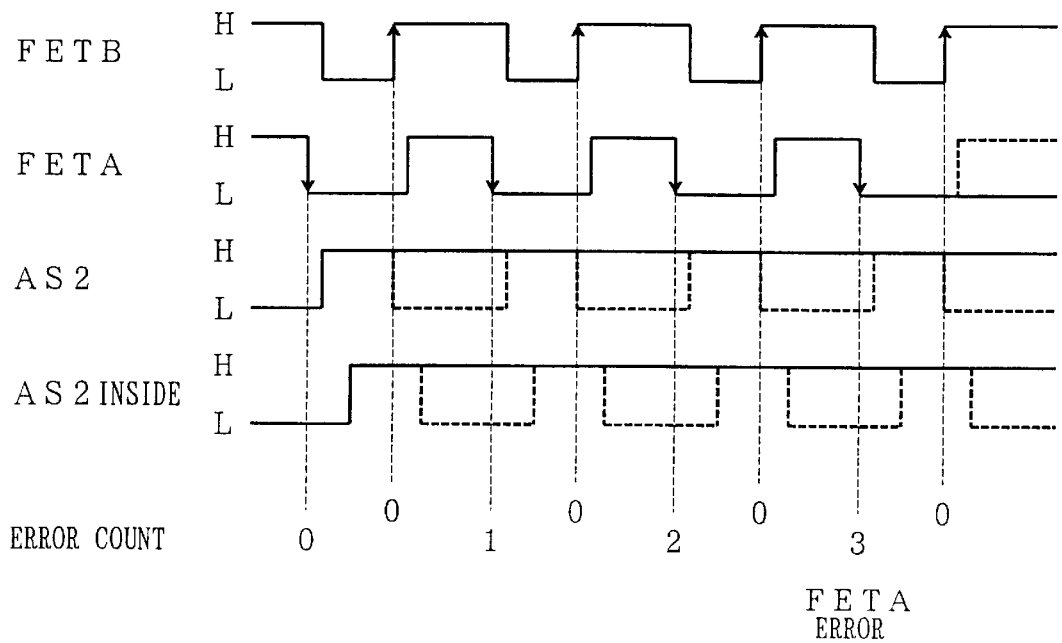
FIG. 18 illustrates the change in the drain voltage when the drain short-circuits to the power supply.
Figure 20:
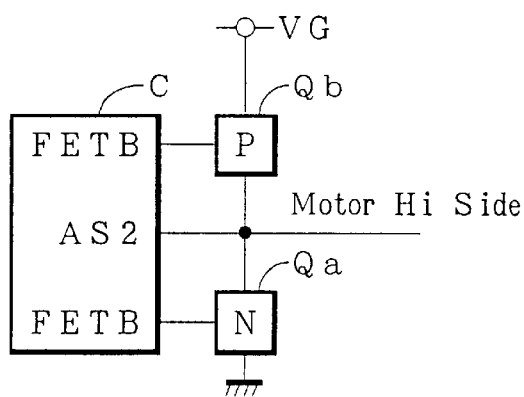
FIG. 20 illustrates a method of measuring the drain voltage according to the preferred embodiment.
Figure 21:
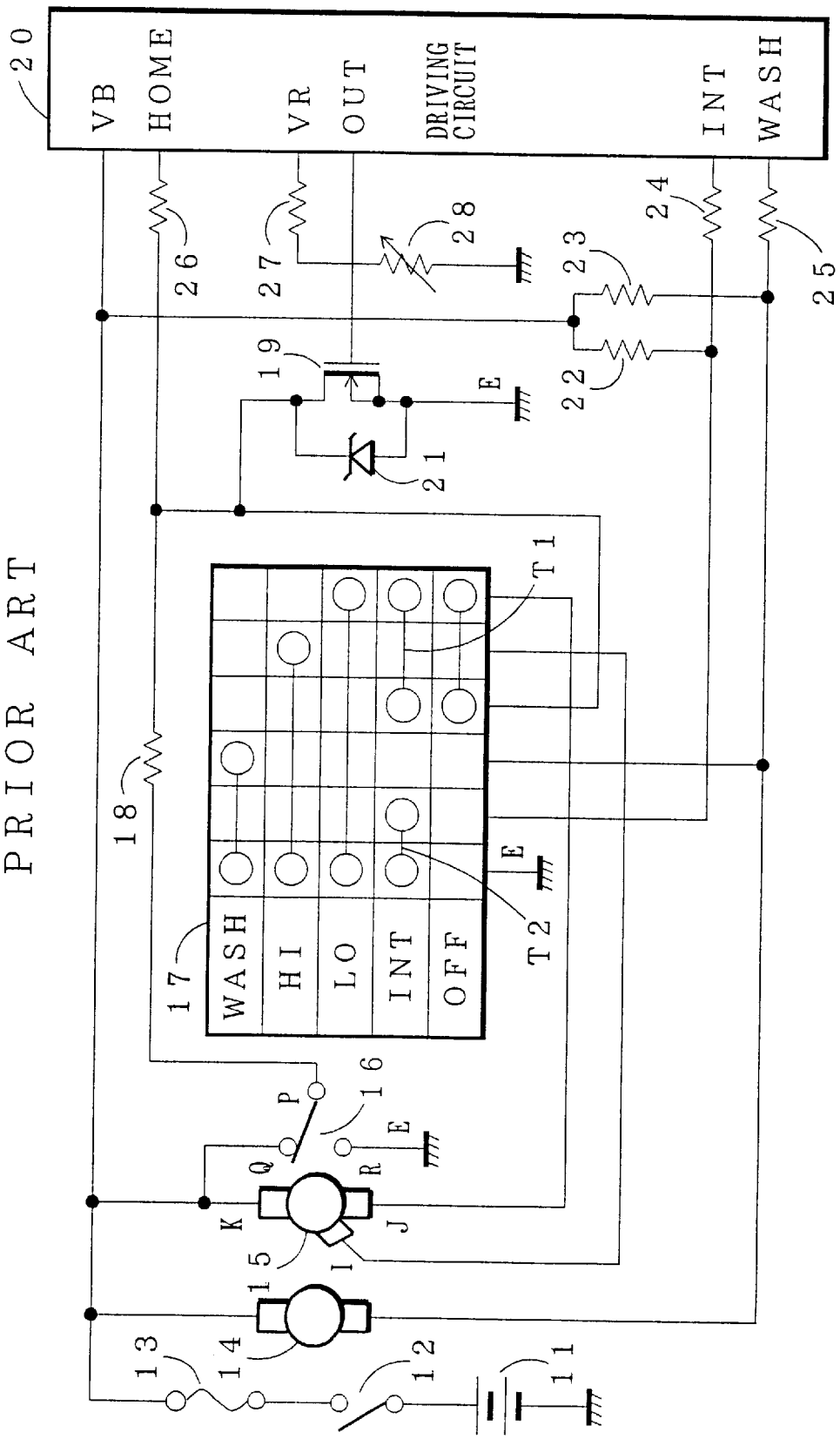
FIG. 21 shows a constitution of a conventional wiper control device.

1. When the FETA is set on, the VG in the MTR line short-circuits to GND.
2. When the short circuit condition continues for a specific period of time, the overheat-cutting protective function works to raise the level of the drain voltage Vd of the FETA close to the VG (see a waveform 1 in FIG. 13).
3. Therefore, the overheat-cutting protective condition of the FETA can be detected by monitoring the drain voltage Vd.
4. When the drain voltage is higher than Vne, the overheat-cutting protective function is deemed to work and it is judged to be in error. Here, the Vne is a threshold for detecting the overheat-cutting protection of n-channel FET (FETA (Qa)) and is ½VG (see FIG. 18).
5. As shown in FIG. 20, the AS2 terminal of the controller 2 is used for monitoring the drain voltage Vd. A digital filter reading 2 ms×3 times in the digital control section is connected to the AS2 terminal.
6. A timing of the detection of the drain voltage Vd is when the FETA (Qa) is set off (that is, negative edge of the FETA). The potential of the AS2 terminal monitored at this time is a value corresponding to a time delay for the digital filter. When the error is counted three times in a row, it is judged that the overheat-cutting protective function is in operation. The counted value of the error is cleared when the normal action starts.
7. When the overheat-cutting protective function is judged in operation, the output of the FETA (Qa) is set off and thereafter the control with respect to the FETA and FETB is halted. This halt is removed only when an ignition key (ING; not shown in the figure) is set off.

Figure 14:
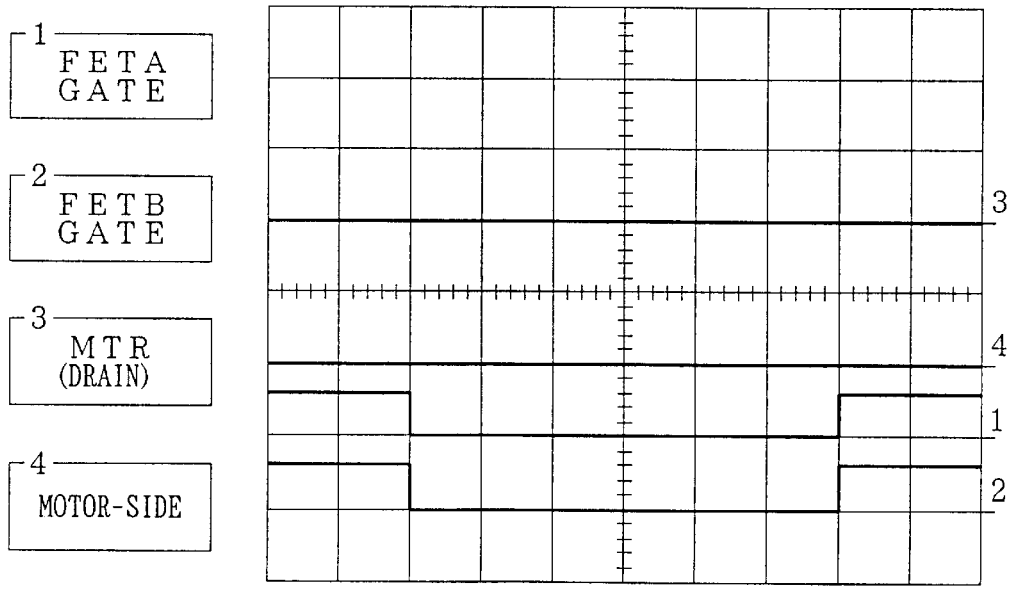
FIG. 14 shows waveform graphs of the drain voltage of each FET when the drain short-circuits to ground.
Figure 19:
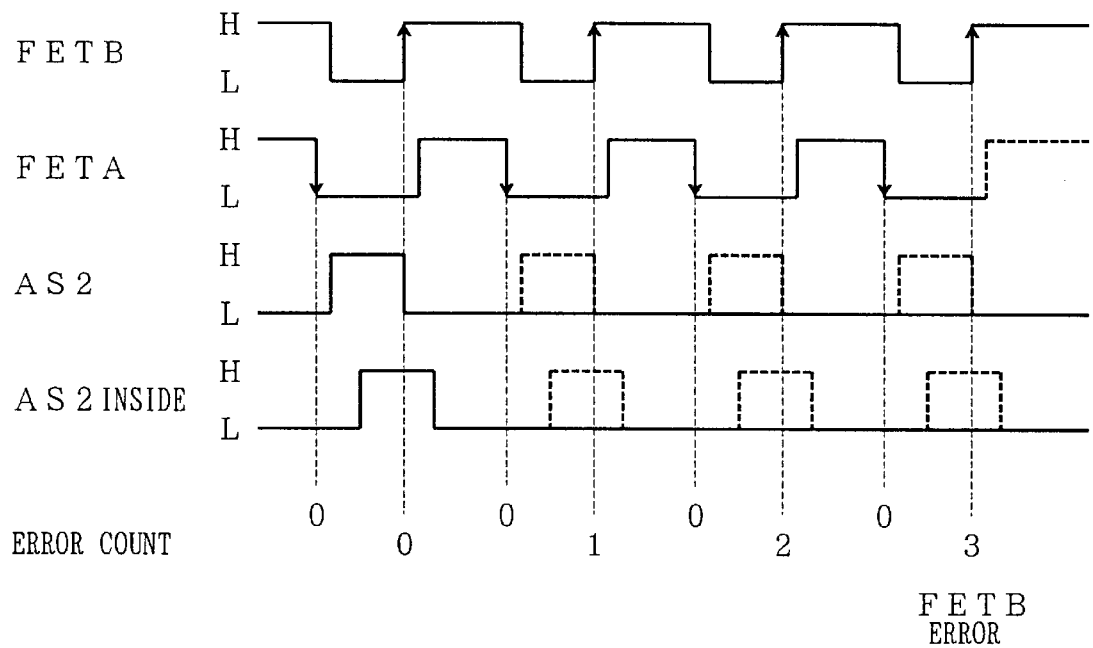
FIG. 19 illustrates the change in the drain voltage when the drain short-circuits to ground.

(2) In the Circumstance when the MTR Line Short-circuits to GND (the Protection of the FETB (Qb) for Actuating the Motor)
1. When the FETB (Qb) for actuating the motor is set on, the GND in the MTR line short-circuits to the VG.
2. When the short circuit condition continues for a specific period of time, the overheat-cutting protective function of the FETB works to drop the level of the drain of the FETB close to the GND even though the FETB is set on (see FIG. 14).
3. Therefore, the overheat-cutting protective condition of the FETB can be detected by monitoring the drain voltage Vd.
4. For example, When the drain voltage Vd is lower than Vpe even though the FETB is set on, it is judged to be in error. Here, the Vpe is a threshold for detecting the overheat-cutting protection of p-channel FET and is ½VG (see FIG. 19).
5. A timing of the detection of the drain voltage Vd is when the FETB (Qb) is set off (that is, positive edge of the FETB). When the error is counted three times in a row, it is judged that the overheat-cutting protective function is in operation. The counted value of the error is cleared when the normal action starts.
6. When the overheat-cutting protective function is judged in operation, the output of the FETB (Qb) is set off and thereafter the control with respect to the FETA and FETB is halted. This halt is removed only when the ING is set off.

Figure 12:
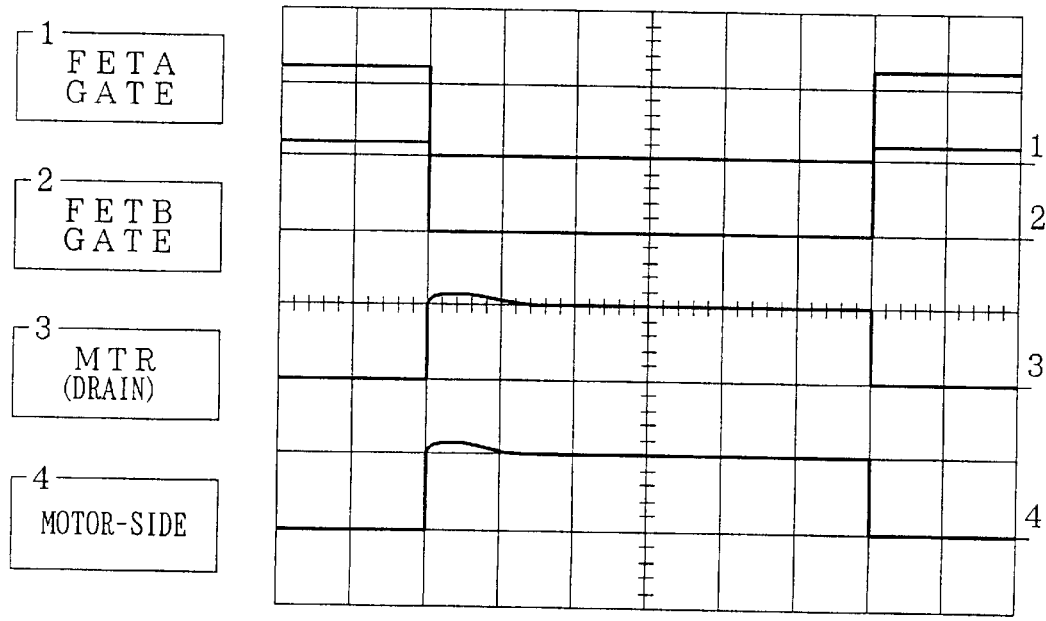
FIG. 12 shows waveform graphs of the drain voltage of each FET when the wiper motor is locked.

(3) Action when the Motor is Locked
As shown in the third waveform in FIG. 12, the drain voltage when the motor is locked drops from 13.5 volts to 10.5 volts supposing VG=13.5 volts. However, since there is a margin with respect to ½VG (6.5 volts), there is no possibility of an error in detection of the overheat-cutting protective action.

FIG. 15 is a table describing each drain voltage of the FETA and FETB for each action condition when the power supply voltage is set 8, 13.5 and 18 volts.

Figure 16:
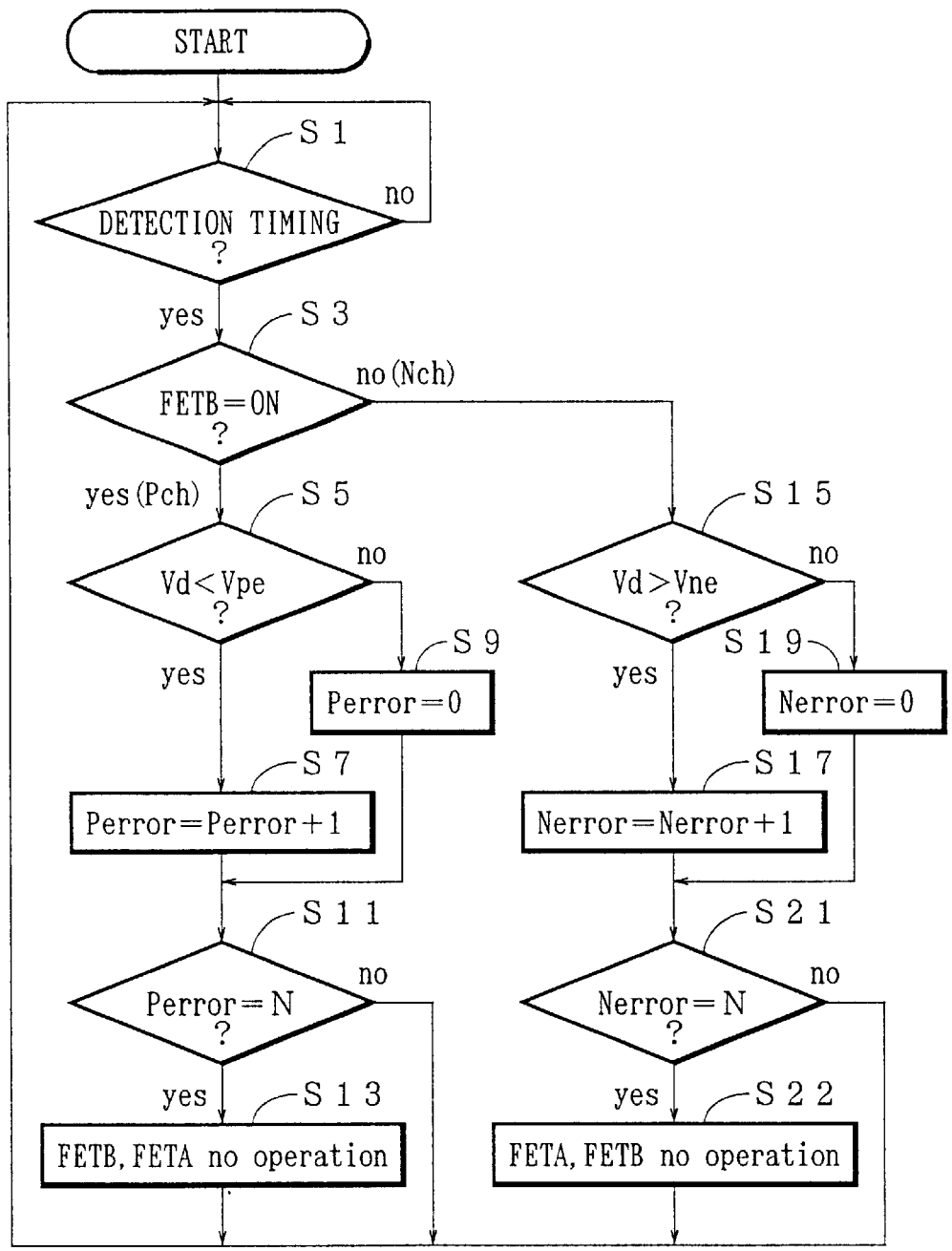
FIG. 16 is a flow chart illustrating a detection method of the overheat protection according to the preferred embodiment.

In the following, each sequence of the above overheat-cutting protective action will be explained with reference to a flow chart shown in FIG. 16.

If the processing is judged to reach a detection timing of the drain voltage with rise or drop of the gate voltage of the FETA (Qa) or FETB (Qb) (step S1), whether or not the FETB is set on is judged (step S3). When the FETB (Qb) is set on, whether or not the drain voltage Vd is lower than Vpe (½VG) (step S5) is judged, and if lower, it is judged that the drain and ground is short-circuited, that is, the overheat-cutting protective function is acted, and "1" is added to the number of times of short circuit detection Perror (step S7).

It is judged whether or not the added value of the number of times of short circuit detection Perror reaches a reference value (for example, three) (step S11). If the reference value is not reached, the processing returns to step S1 and the process from step S1 to step S7 is repeated. If reached, it is judged that the drain and ground is actually short-circuited, that is, the overheat-cutting protective function is acted, and each action of the FETA (Qa) and FETB (Qb) is halted (step S13). After the cause of the short circuit is removed, each action of the FETA (Qa) and FETB (Qb) is restored.

In this connection, if Vd<Vpe is judged at step S15 before the added value reaches the reference value, the added value is reset to be zero regarding the change in the drain voltage Vd to be transient.

At step S3, when the FETA (Qa) is judged set on, whether or not the drain voltage Vd is higher than Vne (½VG) is judged, and if higher, it is judged that the drain short-circuited to the power supply VG, that is, the overheat-cutting protective action is functioned, therefore "1" is added to the number of times of accident detection Perror (step S17). It is judged whether or not the added value of the number of times of short circuit detection Perror reaches the reference value (step S21).

If the reference value is not reached, the processing returns to step S1 and the process from step S1 to step S7 is repeated. If reached, it is judged that the drain and the power supply VG is actually short-circuited, that is, the overheat-cutting protective function is acted, and each action of the FETA (Qa) and FETB (Qb) is halted (step S13). After the cause of the short circuit is removed, each action of the FETA (Qa) and FETB (Qb) is restored.

In this connection, if Vd>Vpe is judged at step S15 before the added value reaches the reference value, the added value is reset to be zero regarding the change in the drain voltage Vd to be transient.

Figure 4:
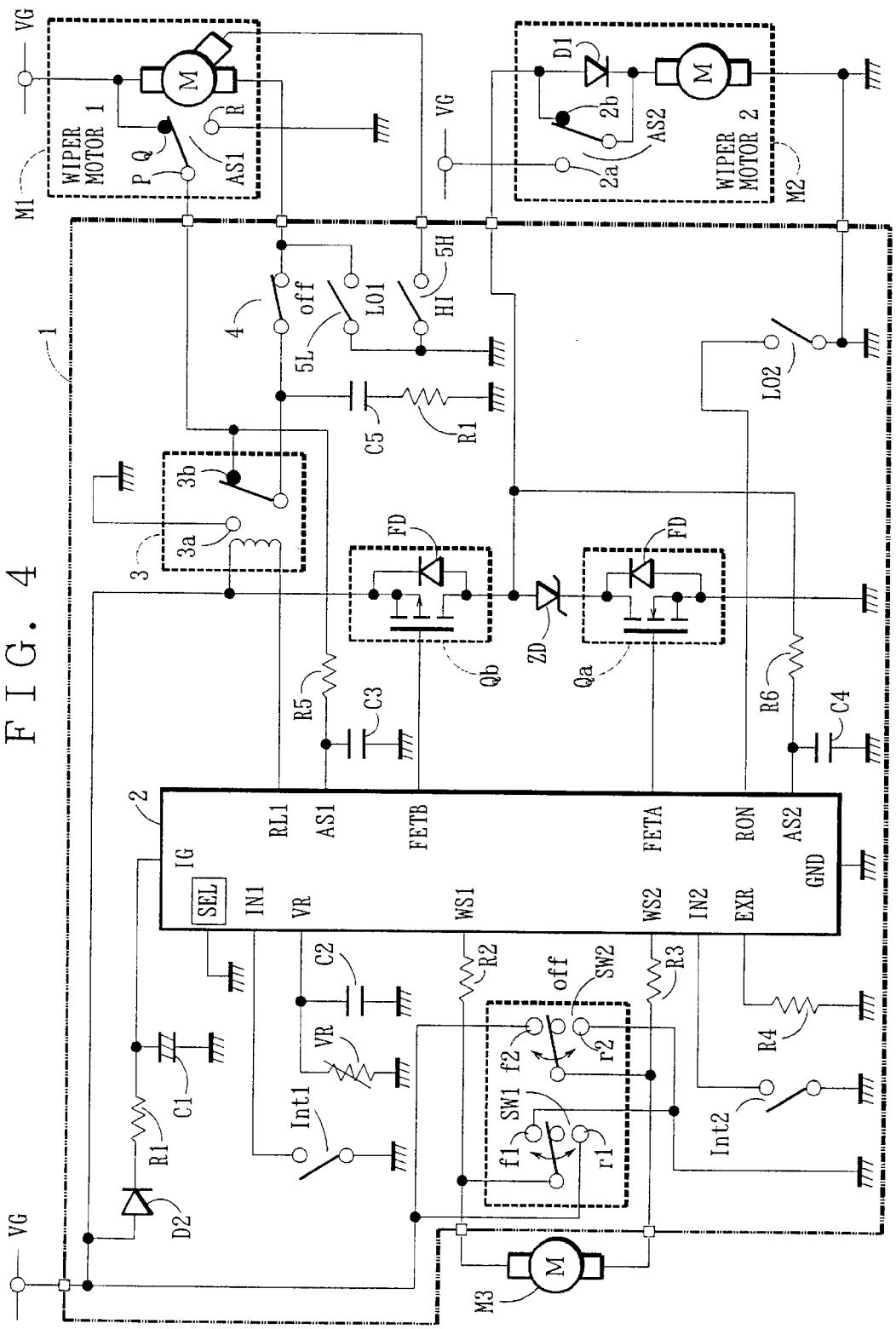
FIG. 4 shows a whole construction of a wiper control device according to another preferred embodiment.

In the above preferred embodiment, the overheat-cutting protective action is explained for an example of the wiper motor M2 connected between the drain and ground. Such an overheat-cutting protective action can also be applied to a wiper motor M2 connected between the power supply VG and the drain as shown in FIG. 4.

That is, the wiper motor M2 is connected between the anode of the Zener diode ZD and the power supply VG through the diode D1.

At the ground side of the wiper motor M2, a traveling contact is connected to the anode-side of the diode D1 and provided is an AS switch AS2 consisting of an always-closing-type fixed contact 2b, which is connected to the cathode-side and comes in contact with the traveling contact in response to the revolution of the motor M2, and an always-closing-type fixed contact 2a, which is connected to the ground-side and comes in contact with the traveling contact in response to the revolution of the motor M2.

The aforementioned preferred embodiments are described to aid in understanding the present invention and variations may be made by one skilled in the art without departing from the spirit and scope of the present invention.

In the present invention, the wiper control device comprises a controller for outputting a control signal, which responds to a drive or halt of a wiper motor, to a first field-effect transistor and a second field-effect transistor, wherein the wiper motor is connected between a drain of the field-effect transistor and ground and/or between the drain and a power supply, the first and second field-effect transistors are connected in series between the power supply and ground through the drain, and the controller comprises:

drain voltage detection means for detecting a drain voltage of the first field-effect transistor or the second field-effect transistor;

short circuit detection means for detecting a short circuit of a drain circuit on the basis of an abnormal value of the detected drain voltage;

count means for counting the number of times of the detection of the short circuit;

comparison means for comparing the number of times of the detection of the short circuit with a predetermined reference number of times; and judgment means for judging an occurrence of the short circuit when the number of times of the detection of the accident consecutively reaches the reference number of times.

Thereby, the field-effect transistor (FET) judged involved with an occurrence of the short circuit is set OFF and the control of the pertinent FET is halted thereafter. Since the short circuit, which might take place with a constitution of a conventional wiper control device, can be prevented from occurring, therefore the reliability of the whole wiper control system can be improved.

The short circuit detection means of the wiper control device according to the present invention comprises:

first detection means for detecting a short circuit of the drain coming into contact with ground when the drain voltage approximates to the ground potential upon the first field-effect transistor being on; and second detection means for detecting an short circuit of the drain coming into contact with the power supply when the drain voltage approximates to a power supply voltage upon the second field-effect transistor being on.

Thereby, when the potential generated at the drain is not a normal potential upon the action of the first field-effect transistor or the second field-effect transistor being on, a matter of the short circuit is judged on the basis of the potential generated at the drain. Therefore, a position where the short circuit takes place can be easily specified.

The short circuit detection means of the wiper control device according to the present invention is provided with delay means for taking in the detected drain voltage with a specific delay time. Thereby, the drain voltage is output with a specific delay time, preventing an instantaneously changed drain voltage from being taken in as a voltage judged indicating short circuit. Therefore, the reliability in judgment of the short circuit can be improved.

The delay means of the wiper control device according to the present invention is constituted by a digital filter, thereby the delay time can be minutely set up and facilitated to be changed.

What is claimed is:

1. A wiper control device comprising a controller for outputting a control signal, which responds to a drive or halt of a wiper motor, to a first field-effect transistor and a second field-effect transistor, wherein the wiper motor is connected between a drain of the first field-effect transistor and ground or between the drain and a power supply, the first and second field-effect transistors are connected in series between the power supply and ground through the drain, and the controller comprises:

drain voltage detection means for detecting a drain voltage of the first field-effect transistor or the second field-effect transistor;

short circuit detection means for detecting a short circuit of a drain circuit on the basis of an abnormal value of the detected drain voltage;

count means for counting the number of times of the detection of the short circuit;

comparison means for comparing the number of times of the detection of the short circuit with a predetermined reference number of times; and judgment means for judging an actual occurrence of the short circuit when the number of times of the detection of the short circuit of the drain circuit consecutively reaches the reference number of times.

2. The wiper control device according to claim 1, wherein the short circuit detection means comprises:

first detection means for detecting a short circuit of the drain coming into contact with ground when the drain voltage approximates to the ground potential when the first field-effect transistor is on; and second detection means for detecting a short circuit of the drain coming into contact with the power supply when the drain voltage approximates to a power supply voltage upon the second field-effect transistor being on.

3. The wiper control device according to claim 1 or 2, wherein the short circuit detection means is provided with delay means for taking in the detected drain voltage with a specific delay time.

4. The wiper control device according to claim 3, wherein the delay means comprises a digital filter.

* * * * *